United States Patent [19]
Glifberg

[11] 3,869,182
[45] Mar. 4, 1975

[54] BALL BEARING
[75] Inventor: Nils Bertil Glifberg, Staffanstorp, Sweden
[73] Assignee: Svenska Sockerfabriks Aktiebolaget, Malmo, Sweden
[22] Filed: July 6, 1973
[21] Appl. No.: 376,987

[52] U.S. Cl. .......................................... 308/187.2
[51] Int. Cl. .............................................. F16c 1/24
[58] Field of Search ...................... 308/187.1, 187.2

[56] References Cited
UNITED STATES PATENTS
3,494,681 2/1920 Anderson et al. ............... 308/187.1
3,639,016 2/1972 Bourgeois ....................... 308/187.2

*Primary Examiner*—M. Henson Wood, Jr.
*Assistant Examiner*—Richard A. Bertsch

[57] ABSTRACT

Ball bearing including an outer ring and a sleeve-shaped inner ring which axially is longer than the outer ring. A first rigid washer is secured to either end of the inner ring and the outer periphery of said washer extends radially past the inner periphery of the outer ring. Said washer adjoins the side face of said outer ring and it is supported by said face at heavy axial load. Provided in the space between said inner ring and said outer ring, between the series of balls and each of the rigid washers, are sealing means and protection means.

4 Claims, 4 Drawing Figures

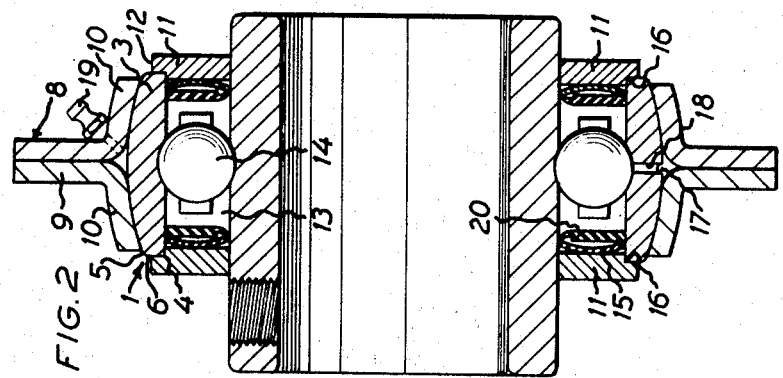
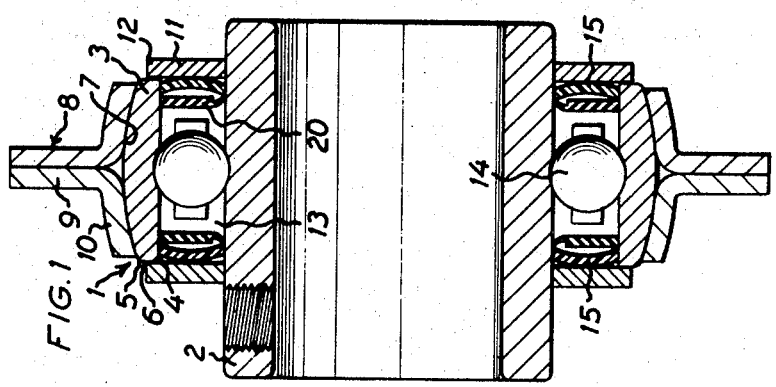

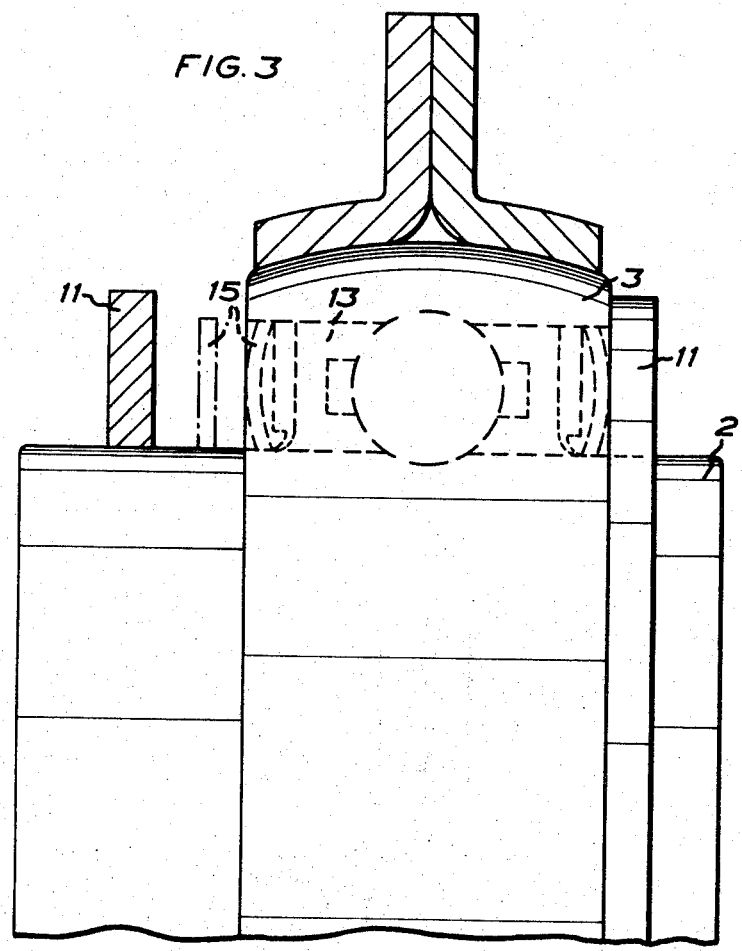

BALL BEARING

The present invention relates to a ball bearing including an inner ring and an outer ring, the inner bearing ring being in the form of a sleeve which projects axially outwardly of a side face of the outer bearing ring, which face is defined by an inner edge and an outer edge, the space for the balls between the inner and outer bearing rings being protected by sealing means against entrance of water and dirt.

The invention is particularly intended for application to so-called packed bearings in which a supply of lubricant, provided when assembling the bearing, is retained and protected by means of simple seals. A ball bearing of this type is a cheap bearing which serves most purposes, it does not require much maintenance and is cheap to replace. However, for certain kinds of machines and on particularly exposed parts of such machines it is too easily damaged and in spite of its cheapness it will be dear in the long run since a destroyed bearing causes stoppages and can have very severe economic consequences which may motivate the use of more advanced and consequently more expensive types of bearings. But even such bearings are unsatisfactory for use in extremely exposed parts of those machines for which this invention has been primarily made. Among such machines there may be mentioned agricultural machines and particularly beet-harvesters having movable parts operating close to or in some cases beneath the ground surface. Bearings for such movable parts are highly exposed to soiling, the action of moisture and corrosive substances and stone shots, which destroy the bearings in a short time. Considering the fact that the time during which agricultural machines are normally used comprises only a short spring, summer or autumn season, each stoppage leads to substantially worse economic consequences than in those cases where machines provided with bearings are in operation all the year round.

To overcome the inconveniences mentioned above and to provide a device which improves the bearing so as to avoid stoppage during seasonal work, the ball bearing of the invention comprises a first rigid washer secured to the outwardly projecting end of the inner sleeve-shaped bearing ring, the outer periphery of said washer extending past the inner edge of the outer bearing ring, said washer adjoining the side face of the outer bearing ring, and a second washer located inwardly of and adjacent said first washer in the space between the bearing rings, said second washer being made of wear-resistant and somewhat elastic material and being so dimensioned and so forced into the space between the bearing rings that it engages with a certain tension those surfaces of the bearing rings and said first washer which define said space.

In such devices the first washer will protect the bearing against shots of stones or other objects hitting the bearing laterally and against major generally axial wedging forces produced by stones caught between the bearing and, for instance, a cog wheel provided on a shaft running in the bearing. Moreover, as it is fixed to the rotary inner ring of the bearing, the rigid first washer positioned immediately adjacent the side face of the outer bearing ring will produce a centrifugal action throwing away water and dirt and keeping the surroundings of the bearing comparatively clean and it prevents thereby to a high degree entrance of moisture and dirt into the bearing. The second washer forms another barrier to entrance of moisture and corrosive substances dissolved in water.

The invention will be described hereinafter with reference to the examples of execution shown in the accompanying drawings, in which:

FIG. 1 is a sectional view of a ball bearing according to one embodiment of the invention;

FIG. 2 is a sectional view of a ball bearing according to another embodiment of the invention;

FIG. 3 is a fragmentary sectional view; and

Figure 4:
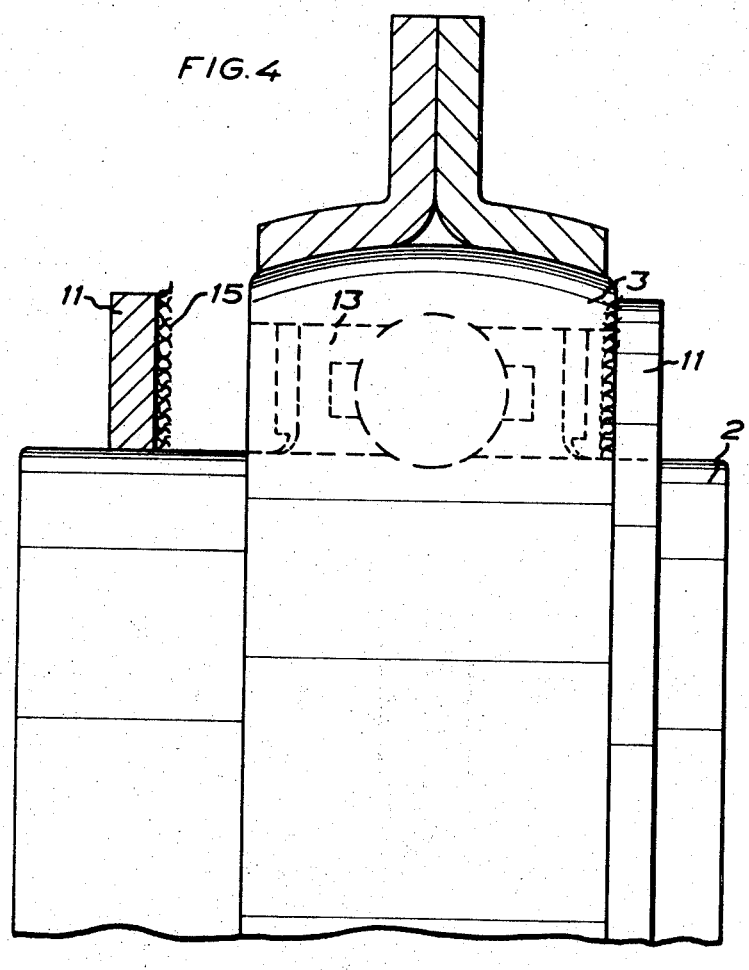
FIG. 4 is a fragmentary sectional view of a third embodiment of the invention.

In the embodiments of the invention shown in the drawings a ball bearing is generally designated by 1. The inner bearing ring of the bearing 1 is designated by 2 and the outer ring of the bearing is designated by 3. The inner bearing ring 2 is in the form of a sleeve projecting axially outwardly of the side face 6 of the outer bearing ring 3, which face is defined by an inner edge 4 and an outer edge 5. The outer bearing ring 3 has a spherical outer face 7 in contact with a corresponding spherical surface in a bearing housing designated by 8. This bearing housing 8 consists of two generally annular bands 10 provided with outwardly extending fixing flanges 9 intended for securing and mounting the bearing 1 in the intended location in the machine. If, for example, the machine is a beet-harvester, it may have a conveyor the lower end of which is located immediately behind the harvesting blades, as counted in the travelling direction of the machine, in or immediately adjacent the ground surface and which is passed over pulleys on a shaft mounted in the bearing 1 shown in the drawings. In this position the bearing 1, which is self-aligning due to the spherical surfaces, such as the surface 7, is highly exposed to soiling, corrosion and breaking.

In accordance with the invention a first rigid washer 11 is secured, preferably by shrinking, on the sleeve-shaped inner ring 2, at the end thereof extending outwardly of the side face 6 of the outer ring 3. This washer 11 reaches by its outer periphery 12 a region just opposite the side face 6 of the outer ring 3, which face is defined by the inner edge 4 and the outer edge 5. However, the washer 11 does not extend so far radially outwardly as to prevent self-alignment of the bearing. A protection means 15 in the form of a washer of wear-resistant, somewhat elastic material, e.g., a suitable plastic material, is forced inwardly of and adjacent the first washer 11, in the space 13 for the balls 14 of the bearing between the inner and outer bearing rings 2 and 3, respectively, in such a way that said second washer 15 engages with a certain tension those surfaces of the inner and outer rings 2 and 3, respectively, which define the space 13. As appears from FIG. 3, the second washer 15 in uninfluenced condition has a diameter somewhat greater than the inside diameter of the outer ring 3 so that the washer 15, when pressed into the space 3, becomes slightly arched in cross-section, in outward direction away from the space 13. For greater clarity the convexity is exaggerated in the drawings.

As appears from FIG. 2, the first washer 11 may have a circumferential recess 16 in the side facing the second washer 15 and the outer ring 3. The first washer 11 will thereby project somewhat into the space 13 between the inner and outer bearing rings 2 and 3, respectively. The first washer 11 is so dimensioned that it can resist the action of wedged stones because of its inherent rigidity and also because it abuts the side face 6 of the outer ring of the bearing when loaded in axial direction. Such dimensioning implies that the washer will be of a considerable thickness (often > 2 mm) so that the particles thrown out due to the rotation of the washer are kept at a safe distance from the outer ring 3.

FIG. 4 shows another embodiment of the protection means 15. According to this embodiment said means consists of short textile fibers which are attached by means of a suitable binder to the inside of the washer 11 so as to form a fluffy, plush-like coating on it. This fluffy plush-like coating replaces the second washer described above.

As appears from FIG. 2 the outer bearing ring may have a circumferential groove 17 with a passage 18 to the interior of the bearing 1 which, together with a lubricant fitting 19 in the housing 8, permits replenishing the supply of lubricant in the bearing. In this bearing packed with lubricant there also are sealing rings 20 of rubber which are per se insufficient for the protection of the bearing against moisture, shocks and soiling.

What I claim and desire to secure by Letters Patent is:

1. In a ball bearing assembly of the type including an inner bearing ring and an outer bearing ring supporting a plurality of balls therebetween, said inner bearing ring being in the form of a sleeve which projects axially outwardly of a side face of the outer bearing ring, said face being defined by inner and outer perhipheral edges, the space for the balls between the inner and outer bearing rings being protected by sealing means mounted in said space inwardly of said side face of the outer ring against entrance of water and dirt, the improvement wherein said bearing comprises a first rigid substantially plane washer of considerable thickness secured to the outwardly projecting end portion of said inner sleeve-shaped bearing ring, the outer periphery of said washer extending radially past said inner edge of said outer bearing ring, said washer overlying and adjoining at least a portion of the side face of said outer bearing ring, and a second protection means located inwardly of and adjacent said first washer within the space between said bearing rings.

2. A ball bearing as claimed in claim 1, wherein said first washer in the side thereof facing said second washer and said outer bearing ring has a circumferential recess in the edge opposite said outer bearing ring, whereby said first washer projects somewhat into the space between said inner and outer bearing rings.

3. A ball bearing assembly of the type including an inner bearing ring and an outer bearing ring, the inner bearing ring being in the form of a sleeve which projects axially outwardly of a side face of the outer bearing ring, which face is defined by an inner edge and an outer edge, the space for the balls between the inner and outer bearing rings being protected by sealing means mounted in said space inwardly of the side face of the outer ring against entrance of water and dirt, said bearing comprising a first rigid substantially plane washer of considerable thickness secured to the outwardly projecting end of the inner sleeve-shaped bearing ring, the outer periphery of said washer extending past the inner edge of the outer bearing ring, said washer adjoining the side face of the outer bearing ring, and a second protection means including a washer located inwardly of and adjacent said first washer in the space between the bearing rings, said second washer being made of wear-resistant and somewhat elastic material and being so dimensioned and so forced into the space that it engages with a certain tension those surfaces of the bearing rings and said first washer which define said space.

4. A ball bearing assembly of the type including an inner bearing ring and an outer bearing ring, the inner bearing ring being in the form of a sleeve which projects axially outwardly of a side face of the outer bearing ring, which face is defined by an inner edge and an outer edge, the space for the balls between the inner and outer bearing rings being protected by sealing means mounted in said space inwardly of the side face of the outer ring against entrance of water and dirt, said bearing comprising a first rigid substantially plane washer of considerable thickness secured to the outwardly projecting end of the inner sleeve-shaped bearing ring, the outer periphery of said washer extending past the inner edge of the outer bearing ring, said washer adjoining the side face of the outer bearing ring, and a second protection means including a flocculent coating arranged on the inside of said first washer.

* * * * *

Notice of Adverse Decision in Interference

In Interference No. 99,772, involving Patent No. 3,869,182, N. B. Glifberg, BALL BEARING, final judgment adverse to the patentee was rendered Feb. 22, 1982, as to claim 1.

[*Official Gazette October 19, 1982.*]